(12) United States Patent
Morganti

(10) Patent No.: US 8,502,116 B2
(45) Date of Patent: Aug. 6, 2013

(54) COOKING, SMOKING, AND AROMATIZATION DEVICE

(75) Inventor: Flavio Morganti, Ourense (ES)

(73) Assignee: Morganti Flavio Innovaciones Grastronomicas, S.L., Ourense (ES)

( * ) Notice: Subject to any disclaimer, the term of this patent is extended or adjusted under 35 U.S.C. 154(b) by 0 days.

(21) Appl. No.: 13/578,478

(22) PCT Filed: Nov. 30, 2010

(86) PCT No.: PCT/ES2010/070788
§ 371 (c)(1),
(2), (4) Date: Oct. 11, 2012

(87) PCT Pub. No.: WO2011/098635
PCT Pub. Date: Aug. 18, 2011

(65) Prior Publication Data
US 2013/0040025 A1    Feb. 14, 2013

(30) Foreign Application Priority Data

Feb. 11, 2010 (ES) .................................. 201030193

(51) Int. Cl.
*A21B 1/22*      (2006.01)
*A47J 27/00*     (2006.01)

(52) U.S. Cl.
USPC ........... 219/399; 219/393; 219/400; 219/401; 219/411; 99/329 R; 99/474; 99/482; 426/314; 426/442; 426/233; 426/438; 126/20; 126/21 A

(58) Field of Classification Search
USPC ............... 219/399–401, 393, 411; 99/329 R, 99/474, 482; 426/314, 442, 233, 438; 126/20, 126/21 A
See application file for complete search history.

(56) References Cited

U.S. PATENT DOCUMENTS

| | | |
|---|---|---|
| 4,455,924 A | 6/1984 | Wenzel |
| 5,910,330 A | 6/1999 | Fessmann |
| 6,182,374 B1 | 2/2001 | Yen |
| 6,835,403 B1 | 12/2004 | Nayyeri |
| 6,903,310 B1 | 6/2005 | Lee, Jr. et al. |
| 2005/0051038 A1 | 3/2005 | Bartelick |

FOREIGN PATENT DOCUMENTS

| | | |
|---|---|---|
| EP | 1 174 037 A2 | 1/2002 |
| WO | WO 2004/077965 A1 | 9/2004 |

*Primary Examiner* — Shawntina Fuqua
(74) *Attorney, Agent, or Firm* — Arent Fox LLP

(57) ABSTRACT

Cooking, smoking and aromatization device which consists of a casing or container (1) comprising a plurality of sealed compartments (2, 3, 4, 5) communicating with the main cooking chamber (6) by means of a plurality of channels or ducts (7) which are controlled by a plurality of valves (8*a*, 8*b*, 8*c*, 8*d*), there being at least one for each of the sealed compartments (2, 3, 4, 5) so that the contents of each of said sealed compartments are supplied to the central cooking compartment (6) with a constantly controlled flow.

12 Claims, 2 Drawing Sheets

COOKING, SMOKING, AND AROMATIZATION DEVICE

CROSS-REFERENCE TO RELATED APPLICATION

This application is a National Stage entry of International Application No. PCT/ES2010/070788 filed Nov. 30, 2010, which claims priority to Spanish Patent Application No. P201030193, filed Feb. 11, 2010, the disclosure of the prior application is hereby incorporated in its entirety by reference.

The object of the present invention is a device that allows having the possibility of cooking by means of vapors flowing from a plurality of chambers or compartments, the flow of said vapors being able to be quantified in a controlled manner, in a single kitchen utensil. An objective of the present invention is to cook, smoke or aromatize depending on the needs of the user, these actions being performed in a single device.

STATE OF THE PRIOR ART

To date, kitchenware suitable for cooking foods such as pots or pans do not have means to perform several types of mixtures in a single cooking chamber and, at the same time, be able to distil or extract the vapors and smoke generated.

Thus, with the current kitchen utensils is unimaginable to cooking a portion of, for example, a turbot providing it in the same cooking device Rueda wine vapor, chamomile tea infusion and cinnamon smoke aroma, defining also the percentages of each of the additives.

EXPLANATION OF THE INVENTION

As mentioned previously, the objective technical problem to be solved by the present invention is to have in a single device, not only cooking, but aromatization and/or smoking means of said cooking. More specifically, the device object of the present invention includes:
  a.—A plurality of heat sources, preferably thermal resistances controlled by thermostats.
  b.—A plurality of sealed compartments communicating with the main cooking and smoking chamber by a plurality of tubes adjusted by two adjustment means such as stopcocks, or the like.
  c.—A cooking chamber having a mesh or gate for supporting the products to be cooked and which can be removed easily for cleaning.
  d.—A waste and vapor collection chamber.

All of it controlled preferably in an electronically manner, in a possible application as a home appliance, so that it will be able to set the operation of the device, especially the percentages of vapors to be added, cooking times, among other.

Optionally there is the possibility of channeling the vapors into a tube for their use on the exterior of the device as a flexible hose to make use secondarily of the generated vapors.

Thanks to the invention here described, different operating modes that give unique conditions to the invention are achieved. Thus, it is possible to use the vapor from the cooking for the following:
  Steaming with entrance of more than one aroma and possibility of smoking while cooking, being able to pass from the traditional steaming to the most sophisticated aromatized steaming, alternating with one or more aromas and even the possibility of adding a touch of smoke, depending on the product and the desired effect.
  A use of the device is the dry smoking, i.e., only with the smoke and the possibility of temperature control (cold, warm, hot, humidity). Smoking can also be not only with a single type of smoke as until now, but with as many as compartments for aromas/smoke that exist, being also possible to add a simple touch of vapor or aromatization after smoking.
  It can be also created with the same device liquid smokes of different origin, intensity, tastes and textures depending on the final objective. These smokes may have a neutral or alcoholic, aromatic base, among others.
  It is possible to distil neutral or aromatized liquids generated with the natural procedure of distillation with evaporation, condensation and collection of the liquid in question for their subsequent storage and use, the simpler use can be the distillation of rose water.
  It is possible the use of the device as distiller, producing alcohol by fermentation and distillation of various types of liquids, highlighting the possibility of creating an infinite basis of extracts which can be from aromatic herbs to fruit concentrates that can have its bases on alcoholic matter or non-alcoholic matter, according to the final use.
  The device gives the possibility of using as a basis for clarification of the evaporated essence. Another possibility is clarifying by aromatization of the liquid in question.
  Another possibility of use of the device is the creation of infusions, from the simplest chamomile tea infusion to the more refined mix of aromas to obtain a subtle, delicate, and elegant evaporated infusion without direct contact with the water, only the aromas extracted by the force of the vapor.

In general, the most important contribution of this invention is to be able to aromatize kind of food without the use of sauces, naturally respecting the origin of the taste of the product.

Finally, it should be noted the possibility of the use as shared cooking device by adding to the cooking chamber some horizontal and/or vertical separators no that by one side the product can be cooked, while the other side it could be smoked.

In one aspect of the invention, the device object of the invention may be integrated in a classic oven of different sizes, simply by varying the dimensions of the device of the invention. In the same way, the device of the invention may be essentially applied to microwave.

The device of the invention can be adapted in autoclaves or cooking chambers, allowing passing from a normal vapor to an aromatized vapor, thus improving the manufacturing processes of preserved foods, and the like.

The versatility of the device object of the invention allows, even its use in open-air establishments, without the use of casing, like the classic fondue, so that it can be generated a system distributed by the different areas of the establishment, creating a novel aromatic atmosphere in the gastronomic world and establishing a new concept of restaurant.

Throughout the description and claims, the word "comprises", and its variants, are not intended to exclude other technical features, components or steps. For those skills in the art, other objects, advantages and features of the invention will result, in part, from the description, and in part, from the practice of the invention. The following examples and drawings are provided by way of illustration, and it is not intended to be limiting of the present invention. In addition, the present invention covers all the possible combinations of particular and preferred embodiments here indicated.

PREFERRED EMBODIMENT OF THE INVENTION

Figure 1:
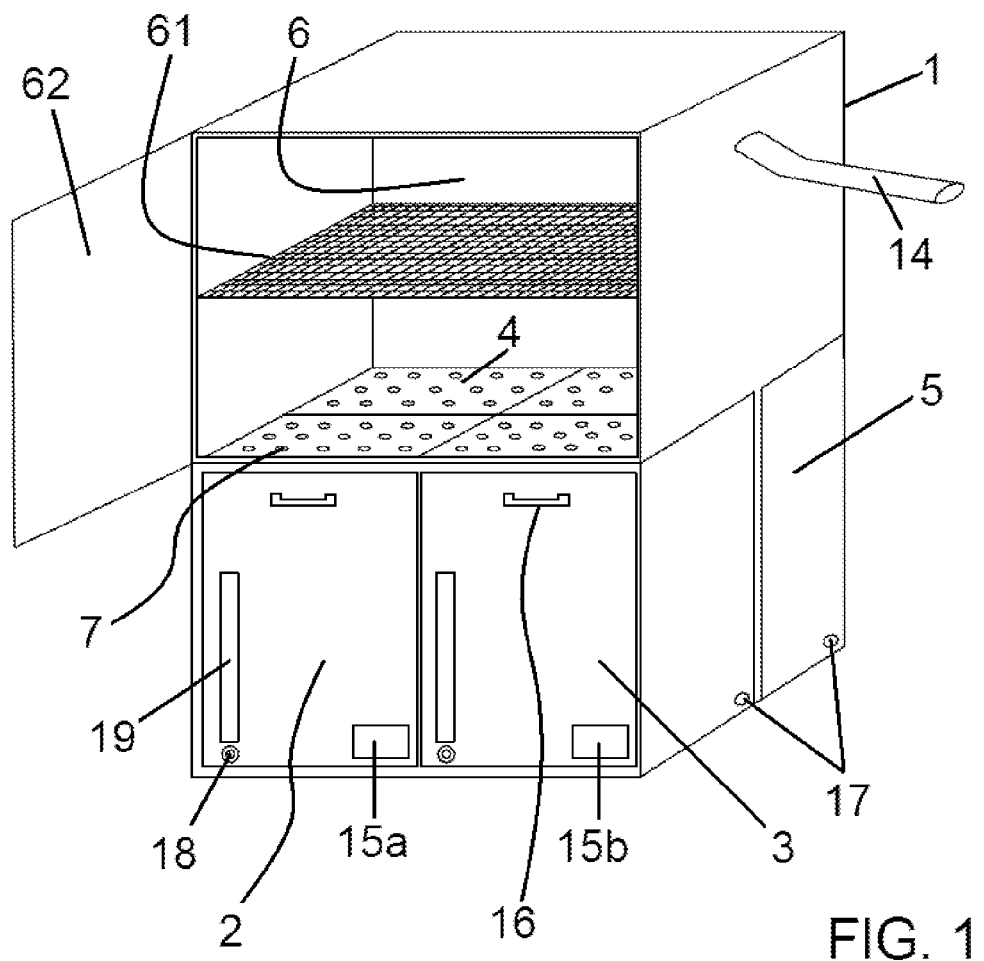
FIG. 1 shows a perspective view of a schematized representation of the device object of the present invention.
Figure 2:
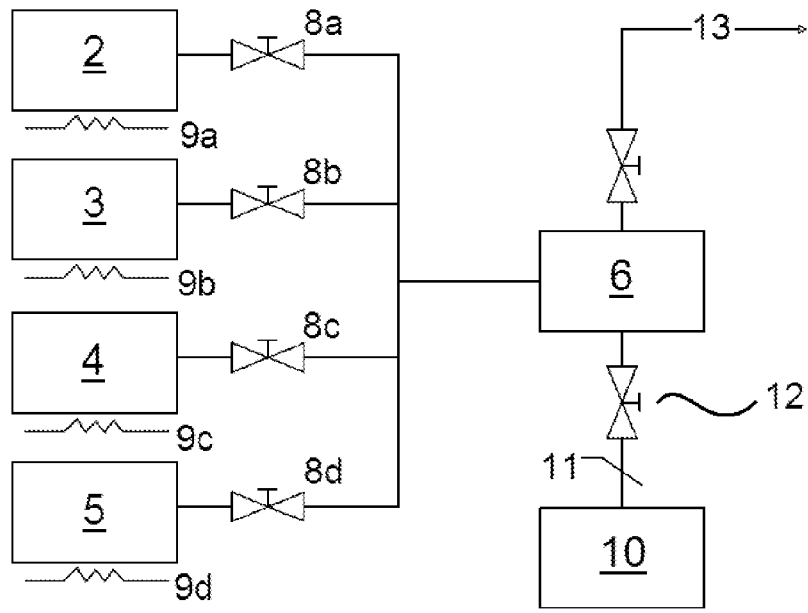
FIG. 2 shows a scheme of the internal working of the device object of the present invention.
Figure 2:
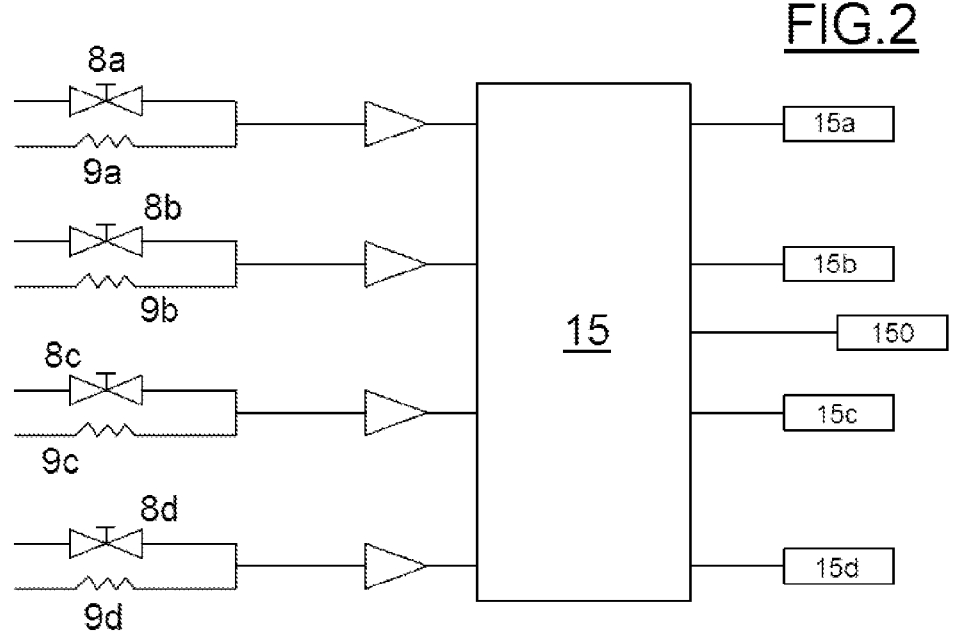

As it can be seen in the accompanying figures, it is shown one schematized of the particular embodiment of the cooking, smoking and aromatization object of the present invention, which being comprised in a casing or container (1), can vary regarding to each practical embodiment given that the device can be integrated into an oven, a microwave, an autoclave, a industrial cooking chamber or simply be open.

Said device comprises a plurality of sealed compartments (2, 3, 4, 5) communicating with the main cooking chamber (6) by means of a plurality of channels or ducts (7), which are controlled by a plurality of valves (8), there being at least one for each of the sealed compartments (2, 3, 4, 5) so that the contents of each of said sealed compartments are supplied to the central cooking compartment (6) with a constantly controlled flow.

The cooking chamber (6) logically has a door (62) that closes the chamber and enables the access as well as, optionally, a mesh or grid (61) configured for supporting the products to be cooked, besides being removable for easy cleaning.

Each one of the sealed compartments (2, 3, 4, 5) as well as the central cooking compartment (6) have each one of them, at least, one heat source (9a, 9b, 9c, 9d for the sealed compartments 2, 3, 4, 5, respectively) preferably an electrical-type resistance, the temperature being controlled by thermostats.

In the same way, it is possible to appreciate the presence of a waste and vapor collection chamber (10) connected to the cooking chamber (6) and to the sealed compartments (2, 3, 4, 5), this duct (11) being controlled by a stop valve (12) with similar characteristics to which control the passing of the sealed compartments (2, 3, 4, 5).

In a particular embodiment, there is the possibility of channeling (13) the vapors/aromas/smoke generated in the cooking chamber (6) for their use on the exterior of the device as a flexible hose (14) to make use secondarily of the generated vapors.

In other particular embodiment, each sealed compartment (2, 3, 4, 5) comprises a hermetic seal (16), an external auxiliary inlet, for additional devices, as distillers, smokers, or the like, a safety valve (18) to avoid excess pressure in the compartments and a interior visualization element (19) of the sealed compartment itself.

The heat sources (9a, 9b, 9c, 9d) and the stop valves (8a, 8b, 8c, 8d, 12) that close the different compartments or chambers are controlled by control means (15) that are also configured to receive the user instructions with regard to the cooking program (steaming, distillation or others) the temperature and the percentage of aroma/smoke passing from each of the sealed compartments (2, 3, 4, 5) to the central chamber (6). Said interfaces with the user (15a, 15b, 15c, 15d, 150) can be one for each of sealed compartment or else only one for the device assembly (150).

As it is possible to deduce, an example of the operation of the device could consist of introducing, first of all, the food to be cooked in the cooking chamber (6) introducing the aromas, vapors or additives in the sealed compartments (2, 3, 4, 5) by configuring the control means (15) to define what percentage of each additive to add to the cooking chamber (6).

In a particular embodiment, on the sealed compartments (2, 3, 4, 5), it will be possible to incorporate an additional heat source, such as a vitro-ceramic hob, an induction hob, a grill, or the like, or a combination of the above elements, wherein said elements are electrically powered by the assembly. This heat source will allow cooking, frying or grilling what desired with an aromatic or smoke concentration, as it is provided for in the present invention.

The invention claimed is:

1. Cooking, smoking and aromatization device which is characterized in that comprises a plurality of sealed compartments (2, 3, 4, 5) communicating with the main cooking chamber (6) by means of a plurality of channels or ducts (7) which are controlled by a plurality of valves (8a, 8b, 8c, 8d), there being at least one for each of the sealed compartments (2, 3, 4, 5) so that the contents of each of said sealed compartments are supplied to the central cooking compartment (6) with a constantly controlled flow;

and wherein each of the sealed compartments (2, 3, 4, 5) as well as the central cooking compartment (6) have each one of them, at least, one heat source (9) preferably an electrical-type resistance, the temperature being controlled by thermostats;

and where the heat sources (9a, 9b, 9c, 9d) and the stop valves (8a, 8b, 8c, 8d, 12) that close the different compartments or chambers are controlled by control means (15) that are also configured to receive the user instructions with regard to the cooking program like steaming, distillation or others, the temperature and the percentage of aroma/smoke passing from each of the sealed compartments (2, 3, 4, 5) to the central chamber (6).

2. Device according to the claim 1 characterized in that the cooking chamber (6) comprises horizontal and/or vertical separators so that on one side the product can be cooked, while on the other it could be smoked.

3. Device according to claim 1 characterized in that the cooking chamber (6) has a door (62) that closes its external access to a mesh or grid (61) configured for supporting the products to be cooked, besides being removable for easy cleaning.

4. Device according to claim 1 characterized in that it comprises a waste and vapor collection chamber (10) connected to the cooking chamber (6) and to the sealed compartments (2, 3, 4, 5), this duct (11) being controlled by a stop valve (12) with similar characteristics to which control the passing of the sealed compartments (2, 3, 4, 5).

5. Device according to claim 1 characterized in that the vapors/aromas/smoke generated in the cooking chamber (6) are channeled (13) for their use on the exterior of the device as a flexible hose (14) to make use secondarily of the generated vapors.

6. Device according to claim 1 characterized in that each sealed compartment (2, 3, 4, 5) comprises a hermetic seal (16), an external auxiliary inlet, for additional devices, a safety valve (18) to avoid excess pressure in the compartments and a interior visualization element (19) of the sealed compartment itself.

7. Device according to claim 1 characterized in that the sealed compartments (2, 3, 4, 5) incorporate an additional heat source, such as a vitro-ceramic hob, an induction hob, a grill, or the like, or a combination of the above elements, wherein said elements are electrically powered by the assembly.

8. Use of the device of claim 1 in an oven.
9. Use of the device of claim 1 in a microwave oven.
10. Use of the device of claim 1 in an autoclave.
11. Use of the device of claim 1 in a cooking chamber.
12. Use of the device of claim 1 in open-air establishments.

* * * * *